United States Patent
Christensen (10) Patent No.: US 11,306,866 B2
(45) Date of Patent: Apr. 19, 2022

(54) SUSPENSION ARRANGEMENT FOR ATTACHING COMPONENTS ON A WALL OF A WIND TURBINE TOWER

(71) Applicant: Vestas Wind Systems A/S, Aarhus N. (DK)

(72) Inventor: Michael Christensen, Silkeborg (DK)

(73) Assignee: Vestas Wind Systems A/S, Aarhus N (DK)

(*) Notice: Subject to any disclaimer, the term of this patent is extended or adjusted under 35 U.S.C. 154(b) by 234 days.

(21) Appl. No.: 16/618,824

(22) PCT Filed: May 16, 2018

(86) PCT No.: PCT/DK2018/050108
§ 371 (c)(1),
(2) Date: Dec. 3, 2019

(87) PCT Pub. No.: WO2018/224102
PCT Pub. Date: Dec. 13, 2018

(65) Prior Publication Data
US 2020/0166177 A1 May 28, 2020

(30) Foreign Application Priority Data

Jun. 9, 2017 (DK) .......................... PA 2017 70451

(51) Int. Cl.
*B32B 41/00* (2006.01)
*F16M 13/02* (2006.01)
(Continued)

(52) U.S. Cl.
CPC ........... *F16M 13/02* (2013.01); *B29C 65/542* (2013.01); *B29C 65/7802* (2013.01); *F03D 80/88* (2016.05); *E06C 7/505* (2013.01)

(58) Field of Classification Search
CPC ....... F16M 13/02; F03D 80/88; B29C 65/542; B29C 65/7802; E06C 7/505;
(Continued)

(56) References Cited

U.S. PATENT DOCUMENTS

| 2005/0139739 A1 | 6/2005 | Hamerski |
| 2009/0167024 A1 | 7/2009 | Landau |
| 2011/0198174 A1* | 8/2011 | Ollgaard ................. F03D 80/88 188/378 |

FOREIGN PATENT DOCUMENTS

| CA | 2460021 C | 10/2009 |
| CA | 2522911 C | 10/2011 |

(Continued)

OTHER PUBLICATIONS

Danish Patent and Trademark Office, Search and Examination Report in PA 2017 70451, dated Nov. 7, 2017.
(Continued)

*Primary Examiner* — Michael N Orlando
*Assistant Examiner* — Joshel Rivera
(74) *Attorney, Agent, or Firm* — Wood Herron & Evans LLP (57) ABSTRACT

A suspension arrangement (7) for attachment to a support (2, 17) being made from a magnetisable material is disclosed. The suspension arrangement (7) comprises a magnetic attachment means (8) and a glue surface (9) having a glue depression (10). The magnetic attachment means (8) comprises a magnetic material allowing the suspension arrangement (7) to be releasably attached to the support (2, 17). The glue depression (10) is configured for receiving a glue portion (11) in order to permanently attach the suspension arrangement (7) to the support (2, 17). The glue surface (9)

(Continued)

is arranged in contact with the support (2, 17) when the suspension arrangement (7) is attached to the support (2, 17).

19 Claims, 10 Drawing Sheets

(51) Int. Cl.
    *F03D 80/80*     (2016.01)
    *B29C 65/54*     (2006.01)
    *B29C 65/78*     (2006.01)
    *E06C 7/50*     (2006.01)

(58) Field of Classification Search
CPC . Y02E 10/728; Y02E 10/72; F05B 2240/912; E04H 12/08
USPC .................... 156/60, 64, 350, 351, 378, 379
See application file for complete search history.

(56) References Cited

FOREIGN PATENT DOCUMENTS

| | | |
|---|---|---|
| CN | 102454558 A | 5/2012 |
| CN | 202791230 U | 3/2013 |
| CN | 203935000 U | 11/2014 |
| CN | 104921574 A | 9/2015 |
| CN | 105818756 A | 8/2016 |
| CN | 205858890 U | 1/2017 |
| DE | 202012009889 U1 | 12/2012 |
| EP | 2078850 A2 | 7/2009 |
| FR | 2878136 A1 | 5/2006 |
| GB | 2191089 A | 12/1987 |
| GB | 2213861 A | 8/1989 |
| WO | 03067083 A1 | 8/2003 |
| WO | 2004099609 A1 | 11/2004 |

OTHER PUBLICATIONS

European Patent Office, International Search Report and Written Opinion in PCT Application No. PCT/DK2018/050108, dated Jul. 11, 2018.

China National Intellectual Property Administration, First Notification of Office Action in CN Application No. 201880037644.4, dated Sep. 22, 2020.

\* cited by examiner

SUSPENSION ARRANGEMENT FOR ATTACHING COMPONENTS ON A WALL OF A WIND TURBINE TOWER

FIELD OF THE INVENTION

The present invention relates to a suspension arrangement for attachment to a support, e.g. forming part of a wall of a wind turbine tower. The invention further relates to a wind turbine tower with such a suspension arrangement, and to a method for mounting such a suspension to a support.

BACKGROUND OF THE INVENTION

Wind turbine towers normally define a hollow interior which, e.g., allow personnel to gain access to the wind turbine, in particular to a nacelle being carried by the wind turbine tower. Various components are normally accommodated inside the hollow interior, and such components often need to be mounted on an interior wall of the wind turbine tower. Such components could, e.g., be platforms, ladders, lamps, clamps for holding power cables, lifts, etc. The components have previously been attached directly to the wall of the wind turbine tower, e.g. by means of welding or by means of bolts.

One disadvantage of attaching components to a wall of a wind turbine tower by means of welding or bolts is that the tower structure is thereby weakened. Therefore costly precautions must be taken, such as increasing the thickness of the wall of the wind turbine tower, in order to ensure that the wind turbine tower is capable of withstanding expected loads during operation.

In order to avoid weakening of the tower structure, alternative attachment methods have been suggested. For instance, in the case that the wind turbine tower is made from a magnetisable material, such as steel, it has been suggested to attach the components to the wall of the wind turbine tower by means of magnets. An example of such a solution is described in WO 03/067083 A1. However, in order to ensure that the magnets are capable of handling the forces applied to the components during use, the magnets need to be very strong. This adds to the costs of the wind turbine, and it also makes it difficult to reposition the components once they have been attached to the wall at a given position. This puts requirements on the precision during initial positioning of the components.

An alternative suggestion is to attach the components to the wall of the wind turbine tower by means of glue. Examples of such a solution are described in DE 20 2012 009 889 U1 and in EP 2 078 850 A2. In this case it is necessary to ensure that the components remain in position while the glue cures. Furthermore, a high precision is required during positioning of the components.

DESCRIPTION OF THE INVENTION

It is an object of embodiments of the invention to provide a suspension arrangement for attachment to a support, wherein the suspension arrangement can be easily positioned with high accuracy.

It is a further object of embodiments of the invention to provide a suspension arrangement for attachment to a support, wherein reliable attachment to the support is obtained without weakening the support and at low cost.

It is an even further object of embodiments of the invention to provide a method for mounting a suspension arrangement to a support in an easy manner and with high accuracy.

It is an even further object of embodiments of the invention to provide a method for mounting a suspension arrangement to a support in a reliable and cost efficient manner, without weakening the support.

According to a first aspect the invention provides a suspension arrangement for attachment to a support being made from a magnetisable material, the suspension arrangement comprising:
- a magnetic attachment means comprising a magnetic material allowing the suspension arrangement to be releasably attached to the support, and
- a glue surface having a glue depression configured for receiving a glue portion in order to permanently attach the suspension arrangement to the support, the glue surface being arranged in contact with the support when the suspension arrangement is attached to the support.

Thus, in a first aspect the invention provides a suspension arrangement. In the present context the term 'suspension arrangement' should be interpreted to mean an arrangement which is configured to be attached to a suitable support, while carrying at least its own weight and a further load. The suspension arrangement may be integrated into a component, for example a cabinet. In this case the suspension arrangement shall be able to carry the weight of the component into which it is integrated. Such a component may have at least one suspension arrangement.

The suspension arrangement according to the first aspect of the invention is for attachment to a support being made from a magnetisable material, such as steel or iron. The support could, e.g., be or form part of a wind turbine tower, a wind turbine foundation, a wind turbine nacelle, a wind turbine hub part, or any other suitable kind of support.

Moreover, in the context of the present application the term 'glue' should be interpreted to mean an adhesive that includes substances that, when applied to the glue depression and thereby also the surface of the support, will bind together the suspension arrangement and the support and resist their separation when cured in what is known as a permanent connection.

Furthermore, in the present context the term 'permanently' should be construed to mean a connection that cannot be separated as long as the forces applied to the connection does not exceeds the threshold constituted by the combined holding force of the magnetic attachment means and the glue. If this threshold is exceeded the connection may become separated.

The suspension arrangement comprises a magnetic attachment means and a glue surface. The magnetic attachment means comprises a magnetic material. This allows the suspension arrangement to be releasably attached to a support being made from a magnetisable material, due to magnetic forces acting between the magnetic material of the magnetic attachment means and the magnetisable material of the support.

The glue surface of the suspension arrangement is placed such that it faces the support and such that an intermediate layer of glue can be applied between at least part of the glue surface and the support. For this purpose, the glue surface is configured with a glue depression facing the support and configured for receiving a glue portion. This allows the suspension arrangement to be permanently attached to the support, by means of a glue portion applied to the glue depression, when the glue surface is arranged in contact with the support and after the glue has cured.

Accordingly, the magnetic attachment means of the suspension arrangement can be used for attaching the suspension arrangement to the support during positioning of the suspension arrangement relative to the support. The magnetic forces acting between the magnetic attachment means and the support need not be sufficiently strong to handle additional loads on the suspension arrangement during use. Thereby a cheaper kind of magnet can be used, thereby reducing the costs of the suspension arrangement. Furthermore, while the magnetic attachment means keeps the suspension arrangement in position with respect to the support, it can more easily be detached therefrom, because the magnet can be configured with a holding force necessary to attach the suspension arrangement to the support while allowing the magnet to be repositioned without excessive forces, i.e. exceeding the strength of a human being. Thereby the suspension arrangement can easily be repositioned, e.g. in order to accurately position the suspension arrangement, by adjustment after initial attachment of the suspension arrangement to the support. Accordingly, a very accurate positioning of the suspension arrangement can easily be obtained, and it is ensured that the suspension arrangement remains in this position until the glue portion has been applied and cured. Finally, as the strength of the magnet is reduced, e.g. as compared to the required strength of the magnet of the suspension arrangement disclosed in WO 03/067083 A1, the risk of the operator being squeezed between the suspension arrangement and the support, when positioning the suspension arrangement, is considerably reduced.

Once the suspension arrangement has been positioned with respect to the support in the manner described above, a glue portion can be applied to the glue depression of the glue surface. Once the glue has been allowed to cure, it permanently attaches the suspension arrangement to the support. The magnetic attachment means ensures that the suspension arrangement is kept in position while the glue portion is applied and cured, and the magnetic attachment means press the suspension arrangement against the support during curing of the glue, thereby ensuring a good contact between the curing glue and the support. Furthermore, the stress distribution in the glue is hereby improved, thereby reducing the risk of stress hotspots occurring. Forming the permanent attachment of the suspension arrangement to the support by means of glue is a cost effective and reliable solution.

Accordingly, the suspension arrangement is attached to the support in a manner which is reliable and accurate, which does not weaken the support, and which is cost effective.

A glue portion applied to the glue depression may provide a holding capability against the support which is equal to or larger than a holding capability against the support provided by the magnetic attachment means. According to this embodiment, the holding capability provided by the glue portion is at least as large as the holding capability provided by the magnetic attachment means. Accordingly, the suspension device is primarily attached to the support by means of the glue portion, and the magnetic attachment means is primarily used for positioning purposes and for keeping the suspension arrangement in position during application and curing of the glue. The holding capability provided by the glue portion may be significantly larger than the holding capability provided by the magnetic attachment means, such as approximately twice as large, three times as large, four times as large, five times as large, six times as large, seven times as large, or even larger.

In an embodiment of the invention the magnetic attachment means may be configured with a holding capability that is larger than the holding capability of the glue portion and configured with a combined holding capability of the magnetic attachment means and the glue portion that is equal to or exceeds the weight of the suspension arrangement and an external force.

The suspension arrangement may be provided with at least one glue supply channel, and each glue supply channel may be in communication with the glue depression, thereby allowing the glue depression to be filled with a glue portion when the glue surface is arranged against the support.

According to this embodiment, the suspension arrangement can be positioned at a desired position with respect to the support, with the glue surface arranged against the support. Subsequently, the glue portion can easily be applied to the glue depression, via the glue supply channel(s).

The at least one glue supply channel may comprise an inlet opening formed in a surface of the suspension arrangement, said surface of the suspension arrangement being arranged free of the glue surface. According to this embodiment, the glue portion is supplied to the glue supply channel, and thereby to the glue depression, via the inlet opening. Since the inlet opening is formed in a surface of the suspension arrangement which is free of the glue surface, free access to the inlet opening is ensured, even when the glue surface is arranged against the support. Thereby the glue portion can easily be supplied to the glue depression of the glue surface, even though the glue surface is arranged against the support, and is therefore not directly accessible. For instance, the inlet opening may be formed in a surface of the suspension arrangement, which is arranged opposite to the glue surface. The glue portion may be applied by being injected through the inlet opening via the glue supply channel and into the glue depression by means of a glue gun.

The suspension arrangement may further comprise at least one glue fill check channel in fluid contact with the glue depression and with a fill check outlet arranged in a surface of the suspension arrangement, and the surface of the suspension arrangement may be arranged free of the glue surface, and the glue fill check channel may be arranged such that glue exits through the fill check outlet when the glue depression is sufficiently filled to achieve its holding capability.

According to this embodiment, a fill level of the glue depression can be monitored during filling of the glue depression, by means of the fill check outlet. This could, e.g., be done by monitoring the fill check outlet while filling the glue portion via the glue supply channel. When it is established that glue is exiting through the fill check outlet, this is an indication that the glue depression is sufficiently filled to achieve its holding capability. Accordingly, the glue supply can be stopped, and the glue portion can be left to cure.

The suspension arrangement may comprise a mounting interface configured for mounting a component on the suspension arrangement. According to this embodiment, the suspension device provides an interface between the support and a component which it is desired to mount on the support. The mounting interface may be a multipurpose interface, allowing a variety of different components to be mounted on the suspension arrangement. In this case the suspension arrangement may be regarded as a standard component, allowing mounting of various components on the support. Examples of components to be mounted on the mounting interface include, but are not limited to, ladders, platforms, lamps, cable holders, electrical equipment and cabinets, etc.

As an alternative to providing the suspension arrangement with a mounting interface, the suspension arrangement may simply be or form part of a component to be attached to the support. Examples of such components are mentioned above.

The glue portion may comprise a two component adhesive. According to this embodiment, the two adhesive components may be supplied to the glue depression substantially simultaneously and mixed in the glue depression. Alternatively, the two adhesive components may be mixed immediately prior to supplying the glue portion to the glue depression. In any event, the adhesive starts curing when the two adhesive components have been mixed. Two component adhesives normally have a large holding capability, and they are therefore appropriate for this purpose. Examples of suitable two component adhesives include polyester resins, polyols, acrylic polymers, epoxy, etc.

The magnetic attachment means may be or comprise a permanent magnet. Any suitable permanent magnet can be used. For example ceramic, ferrite or neodymium iron boron magnets.

The magnets are sized according to the magnitude of their magnetic field.

For example neodymium magnets are very strong and can therefore be of a relatively small size to achieve the necessary holding capability. Thereby, the area assigned to the glue depression can be maximized for a given glue surface. However neodymium magnets are costly and therefore the benefit of the relatively larger area that can be assigned to the glue depressions does not make up for the cost of a neodymium magnet compared to a ferrite magnet. Therefore a trade-off should be made between these factors to define the optimum magnet material and size.

According to a second aspect the invention provides a wind turbine tower being made from a magnetisable material, wherein a support is assigned to a wall of the wind turbine tower, the wind turbine tower having at least one suspension arrangement according to the first aspect of the invention attached to the support with its glue surface in contact with the support.

Thus, according to the second aspect of the invention, the support is a wall or a part of a wall of a wind turbine tower, i.e. the suspension arrangement described above with reference to the first aspect of the invention is attached to a wall or a part of a wall of a wind turbine tower. The remarks set forth above are equally applicable here.

It should be noted that the support could, alternatively, be assigned to a steel foundation, e.g. for a wind turbine, a wall of a wind turbine nacelle, a wind turbine hub part, or any other suitable object onto which it may be desired to attach a relevant component.

The glue portion applied to the glue depression may provide a holding capability against the support which is equal to or larger than a holding capability against the support provided by the magnetic attachment means. This has already been described above.

In an embodiment of the invention the magnetic attachment means provide a holding capability that is larger than the holding capability of the glue portion as discussed above.

According to a third aspect the invention provides a method for attaching a suspension arrangement to a support being made from a magnetisable material, the method comprising the steps of:
providing a suspension arrangement according to the first aspect of the invention,
positioning the suspension arrangement on the support by means of magnetic forces acting between the support and the magnetic attachment means of the suspension arrangement, the glue surface of the suspension arrangement being arranged against the support,
applying a glue portion to the glue depression of the suspension arrangement, thereby permanently attaching the suspension arrangement to the support.

It should be noted that a person skilled in the art would readily recognise that any feature described in combination with the first aspect of the invention could also be combined with the second or third aspects of the invention, that any feature described in combination with the second aspect of the invention could also be combined with the first or third aspects of the invention, and that any feature described in combination with the third aspect of the invention could also be combined with the first or second aspects of the invention.

The third aspect of the invention provides a method for attaching a suspension arrangement according to the first aspect to a support made from a magnetisable material. The support could, e.g., be or form part of a wall of a wind turbine tower, a steel foundation, e.g. for a wind turbine, a wall of a wind turbine nacelle, a wind turbine hub part, or any other suitable object onto which it may be desired to attach such a suspension arrangement.

According to the method, a suspension arrangement according to the first aspect of the invention is provided. The suspension arrangement is then positioned on the support by means of magnetic forces acting between the support and the magnetic attachment means of the suspension arrangement. The suspension arrangement is positioned in such a manner that the glue surface of the suspension arrangement is arranged against the support. As described above, this allows the suspension arrangement to be easily positioned accurately with respect to the support, and once positioned the suspension arrangement remains in position on the support, while allowing adjustments to the position of the suspension arrangement.

Finally, a glue portion is applied to the glue depression of the suspension arrangement. Since the suspension arrangement is arranged with the glue surface, and thereby with the glue depression, against the support, the glue portion is thereby arranged in contact with the suspension arrangement as well as with the support. Accordingly, the suspension arrangement is thereby permanently attached to the support by means of the glue portion.

As described above, the suspension arrangement is attached to the support in a manner which is accurate, reliable and cost effective, and which does not weaken the support.

The suspension arrangement may further comprise a mounting interface, and the method may further comprise the step of mounting a component on the suspension arrangement via the mounting interface. This has already been described above with reference to the first aspect of the invention.

The method may further comprise the step of cleaning at least a portion of the support prior to positioning the suspension arrangement on the support. This could, e.g., be done by applying a suitable cleaning agent to a surface of the support, or at least to a portion of the surface where the suspension arrangement is supposed to be attached. This may ensure that any grease, dirt, impurities, etc. is removed before the suspension arrangement is positioned on the support. Thereby the risk of the glue not binding appropriately or sufficiently on the support is considerably reduced.

The step of applying a glue portion to the glue depression may comprise applying the glue portion via a glue supply channel formed in the suspension arrangement. As described above, this allows the glue portion to be applied to the glue depression while the glue depression is arranged against the support.

The method may further comprise the step of monitoring a glue filling level of glue applied to the glue depression, during the step of applying glue to the glue depression, and the step of applying glue to the glue depression may be stopped when the glue level reaches a predefined level. Thereby it is ensured that a sufficient amount of glue is supplied to the glue depression to ensure a given holding capability. It is further ensured that the glue depression is not filled to a level where there is a risk that the suspension arrangement is pushed out of contact with the support by the glue portion.

The suspension arrangement may further comprise at least one glue fill check channel in fluid contact with the glue depression and with a fill check outlet arranged in a surface of the suspension arrangement, said surface of the suspension arrangement being arranged free of the glue surface, and the predefined level of glue may be reached when glue exits said at least one glue fill check channel.

According to this embodiment, the glue depression may advantageously be designed in such a manner that glue starts entering the glue fill check channel when the glue depression has been filled. When the glue reaches the fill check outlet it can be visually verified that the glue depression has been filled, i.e. that the predefined glue filling level has been reached.

The method may further comprise the initial step of assigning the support to be part of a wall of a wind turbine tower. In this case, the suspension arrangement is attached to a part of a wall of a wind turbine tower. This has already been described above with reference to the first aspect of the invention.

Alternatively, the suspension arrangement may be attached to any other suitable kind of support, such as a foundation, a wall of a nacelle, a hub part, etc.

The present invention further relates to use of a suspension arrangement according to the first aspect of the invention for attachment of wind turbine components to the wall of a wind turbine tower. The wind turbine components may, e.g., be in the form of ladders, platforms, lamps, cable holders, etc.

BRIEF DESCRIPTION OF THE DRAWINGS

The invention will now be described in further detail with reference to the accompanying drawings in which.

DETAILED DESCRIPTION OF THE DRAWINGS

Figure 1:
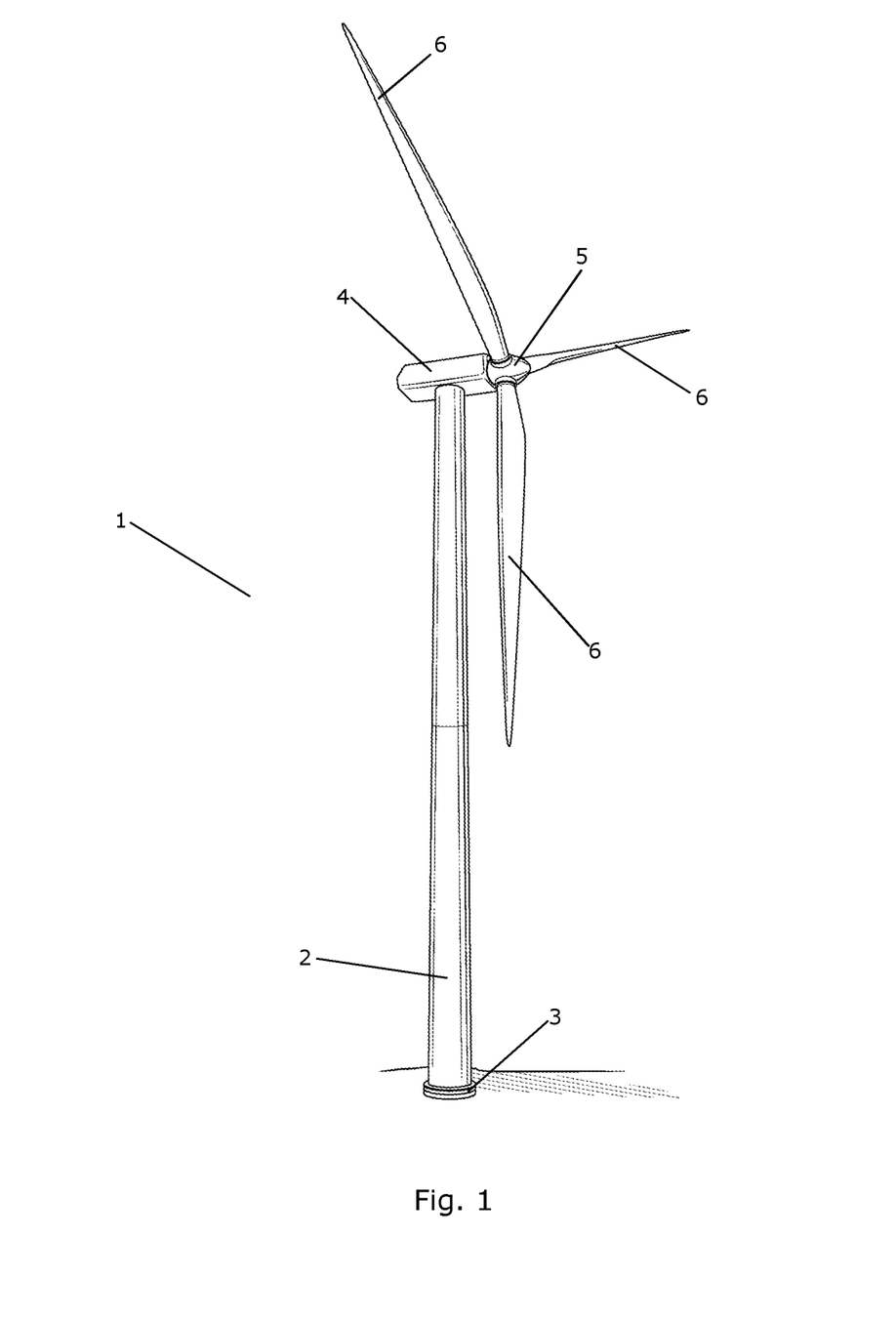
FIG. 1 is a perspective view of a wind turbine.

FIG. 1 is a perspective view of a wind turbine 1 comprising a wind turbine tower 2 mounted on a foundation 3 and carrying a nacelle 4. The wind turbine 1 further comprises a hub 5 carrying three wind turbine blades 6.

Figure 2:
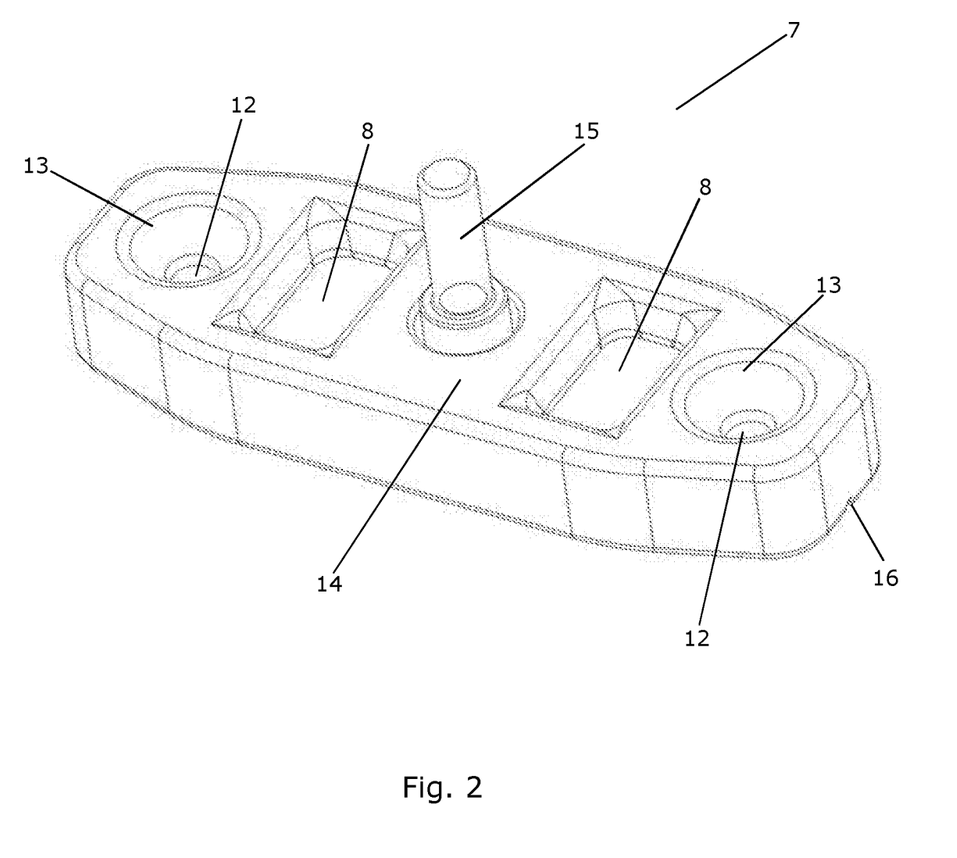
FIGS. 2-4 illustrate a suspension arrangement according to an embodiment of the invention.
Figure 3:
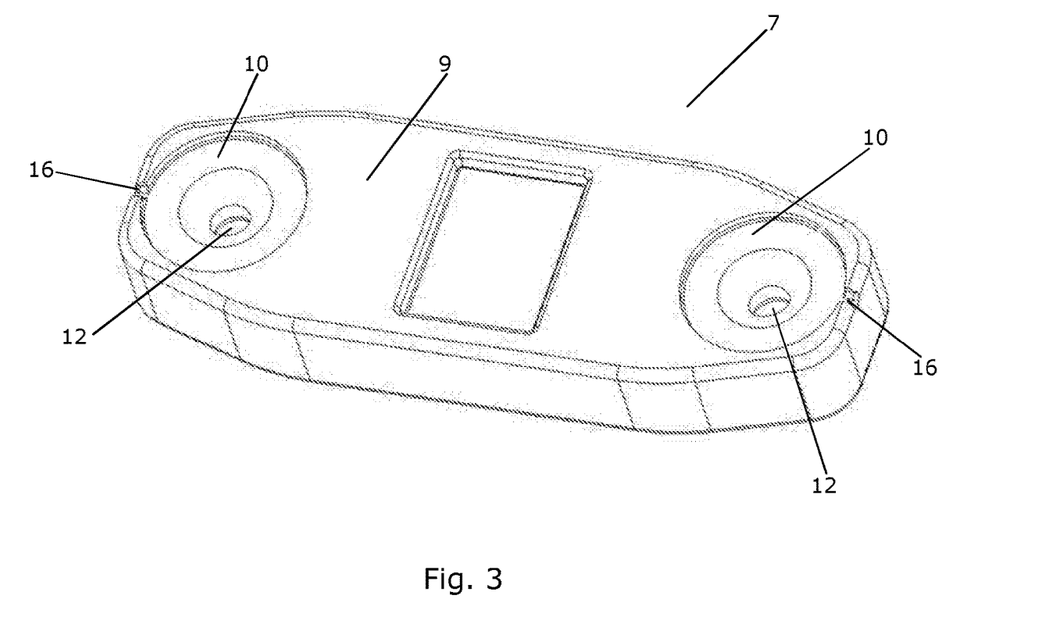
Figure 4:
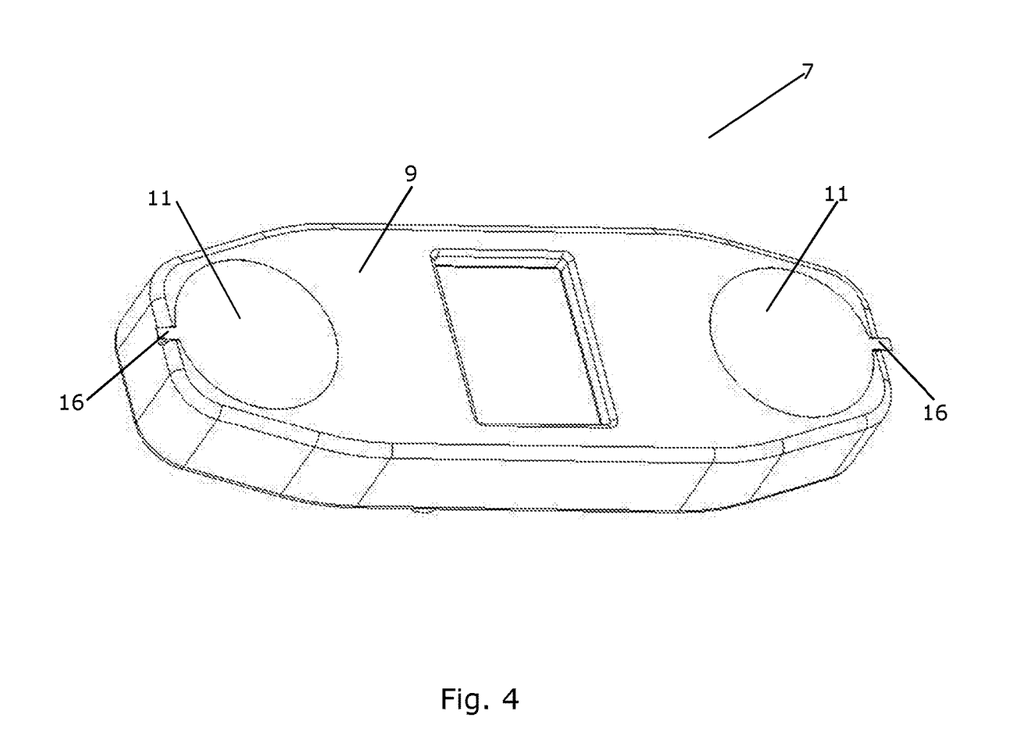

FIGS. 2-4 are perspective views of a suspension arrangement 7 according to an embodiment of the invention, seen from various angles. The suspension arrangement 7 comprises magnetic attachment means 8 in the form of two permanent magnets embedded within a body of the suspension arrangement 7, and a glue surface 9 with two glue depressions 10 formed therein. The glue depressions 10 are configured to receive a glue portion 11 via respective glue supply channels 12, each having an inlet opening 13 formed in a surface 14 of the suspension arrangement 7 being arranged opposite to the glue surface 9. FIG. 3 shows the glue depressions 10 without a glue portion 11, and FIG. 4 shows the glue depressions 10 with a glue portion 11 filled therein.

The suspension arrangement 7 is further provided with a mounting interface 15, allowing a component to be mounted on the suspension arrangement 7. This will be described in further detail below with reference to FIGS. 6-9.

The suspension arrangement 7 of FIGS. 2-4 may be attached to a support being made from a magnetisable material in the following manner. Initially, the suspension arrangement 7 is positioned against the support, e.g. in the form of a part of a wall, with the glue surface 9 facing the support. Due to magnetic forces acting between the magnetic attachment means 8 of the suspension arrangement 7 and the magnetisable material of the support, the suspension arrangement 7 is detachably attached to the support. This allows the suspension arrangement 7 to be accurately positioned relative to the support.

Once the suspension arrangement 7 has been accurately positioned relative to the support, a glue portion 11 is supplied to the glue depressions 10 formed in the glue surface 9. The glue portion 11 is supplied via the inlet openings 13 and the glue supply channels 12, i.e. from the surface 14 which is arranged opposite to the glue surface 9. Thereby the glue portion 11 can be easily applied to the glue depressions 10, even though the glue surface 9 is arranged against the support. During this step, the suspension arrangement 7 is kept firmly in place relative to the support by means of the magnetic attachment means 8.

When the glue depressions 10 have been filled with the glue portion 11, glue starts exiting the glue depressions 10 via glue fill check channels 16 interconnecting the glue depressions 10 and a surface being arranged free of the glue surface 9. Thus, by visually inspecting the outlets of the glue fill check channels 16 it can be established when the glue filling in the glue depressions 10 has reached a certain level. When this is the case, the supply of glue to the glue depressions 10, via the inlet openings 13 and the glue supply channels 12 can be stopped.

The glue portions 11 are then allowed to cure, while the suspension arrangement 7 is kept in position by means of the magnetic attachment means 8. Since the glue portions 11 are arranged against, and thereby in contact with, the support, the glue portions 11 permanently attach the suspension arrangement 7 to the support.

Thus, the suspension arrangement 7 is accurately positioned relative to the support, by means of the magnetic attachment means 8, and permanently attached to the support, with a required holding capability, by means of the glue portions 11. Accordingly, the suspension arrangement 7 is attached to the support in an accurate and cost effective manner, while a sufficient holding capability is ensured, without weakening the support.

Figure 5:
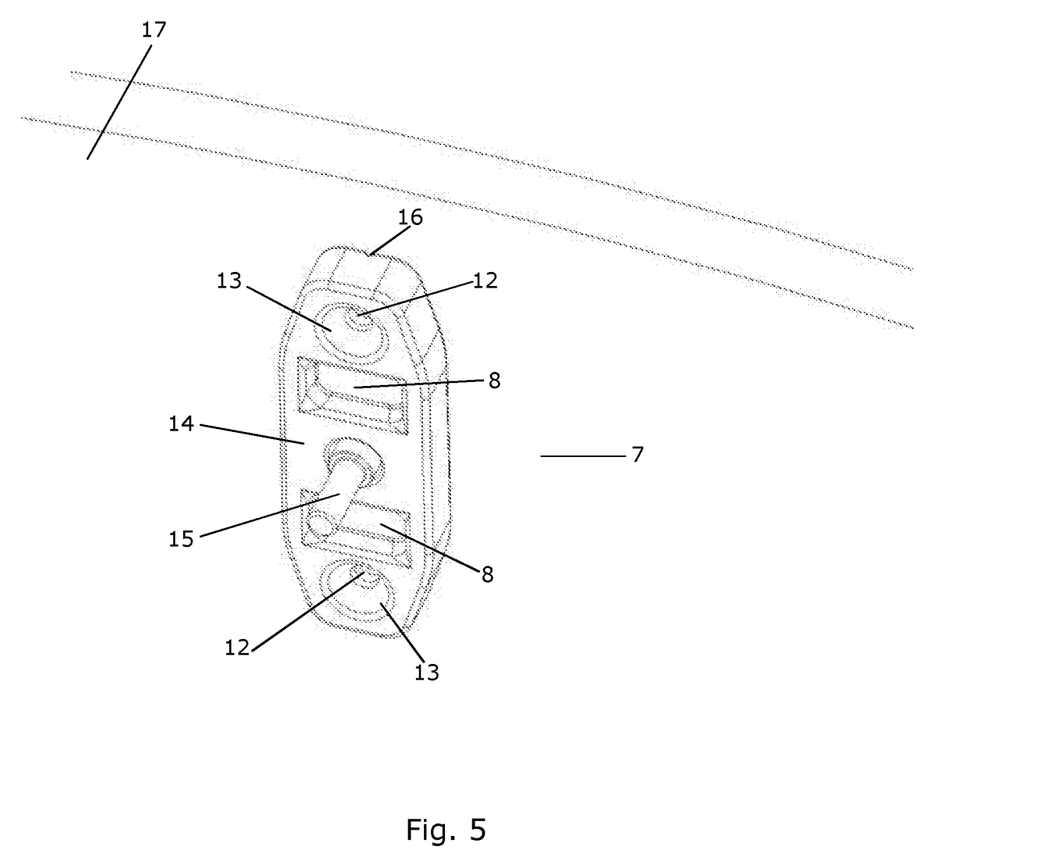
FIG. 5 shows the suspension arrangement of FIGS. 2-4 attached to a support.

FIG. 5 shows the suspension arrangement 7 of FIGS. 2-4 attached to a support 17, in the form of a part of a wall, e.g. an inner wall of a wind turbine tower.

Figure 6:
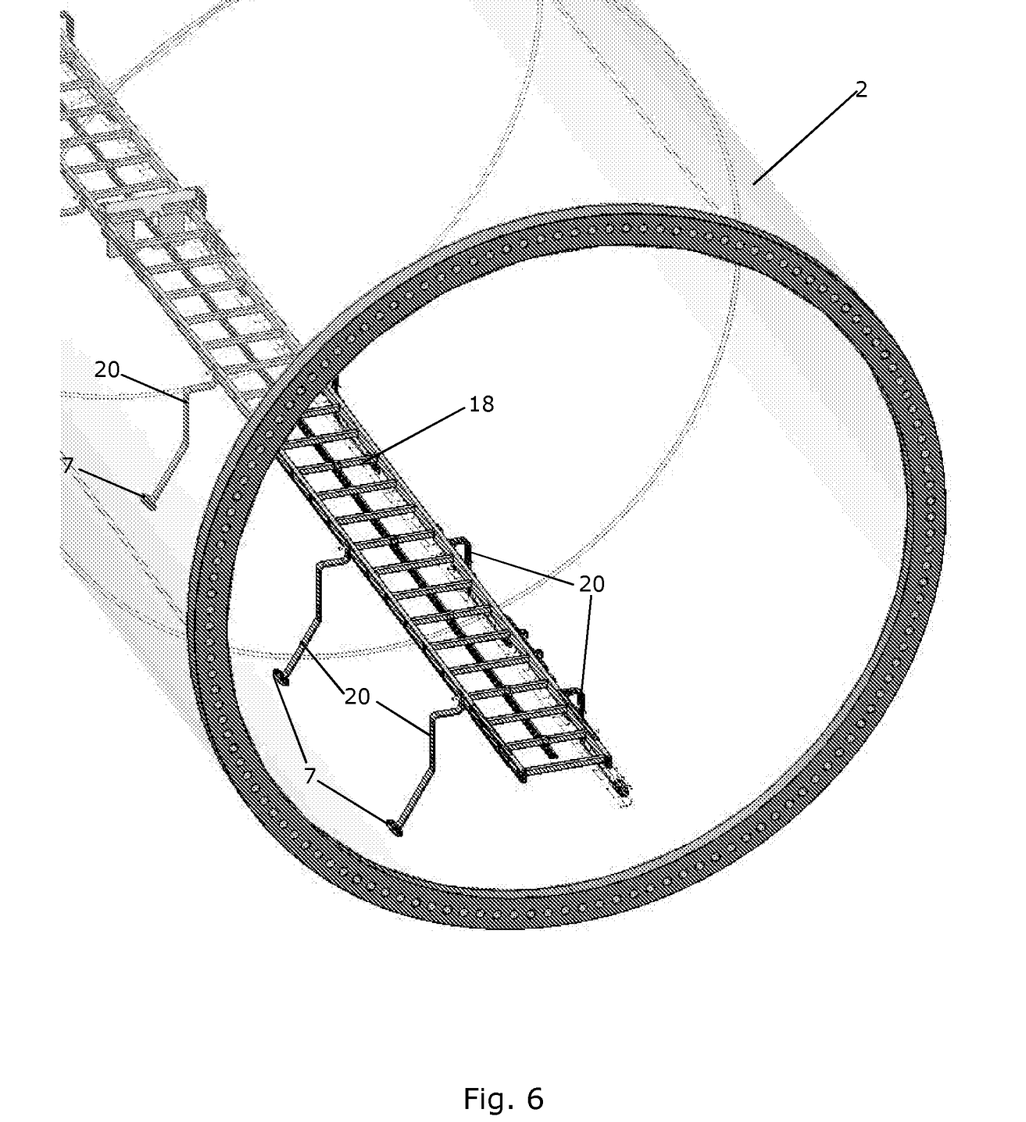
FIGS. 6-8 show a ladder mounted on a wall of a wind turbine tower by means of suspension arrangements according to an embodiment of the invention.
Figure 7:
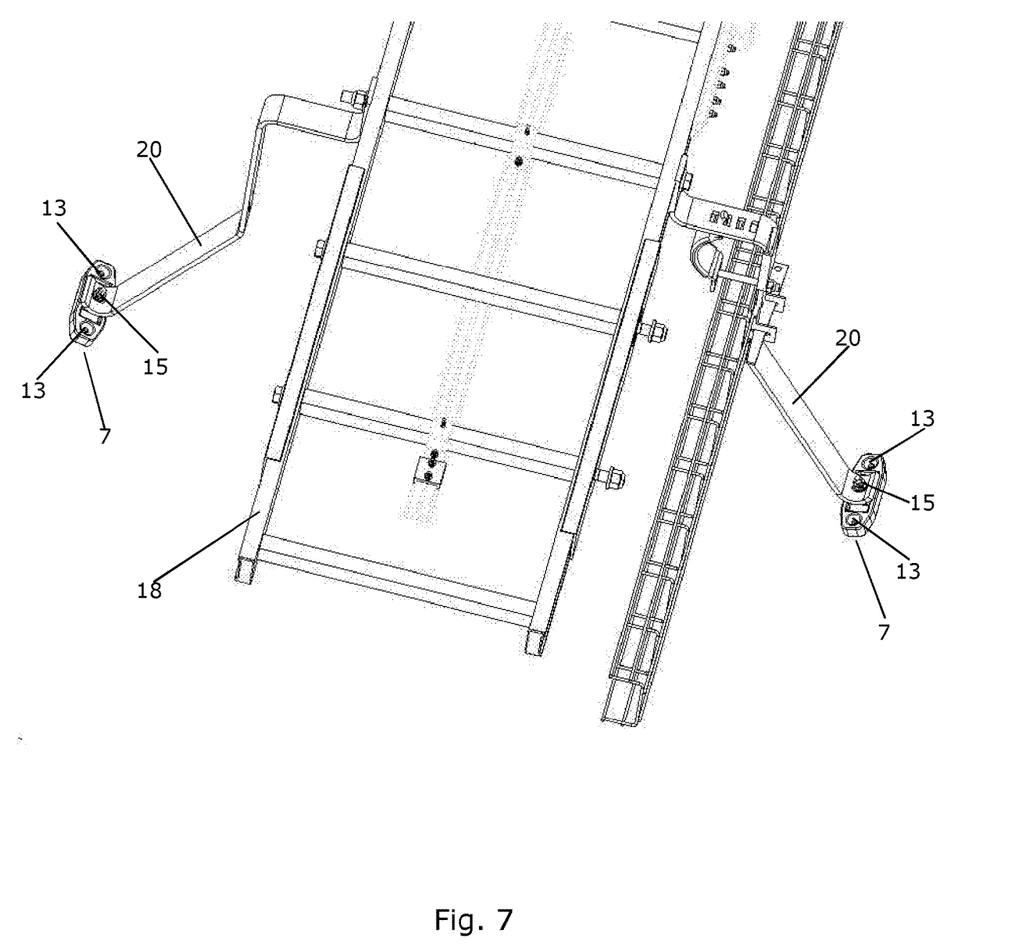
Figure 8:
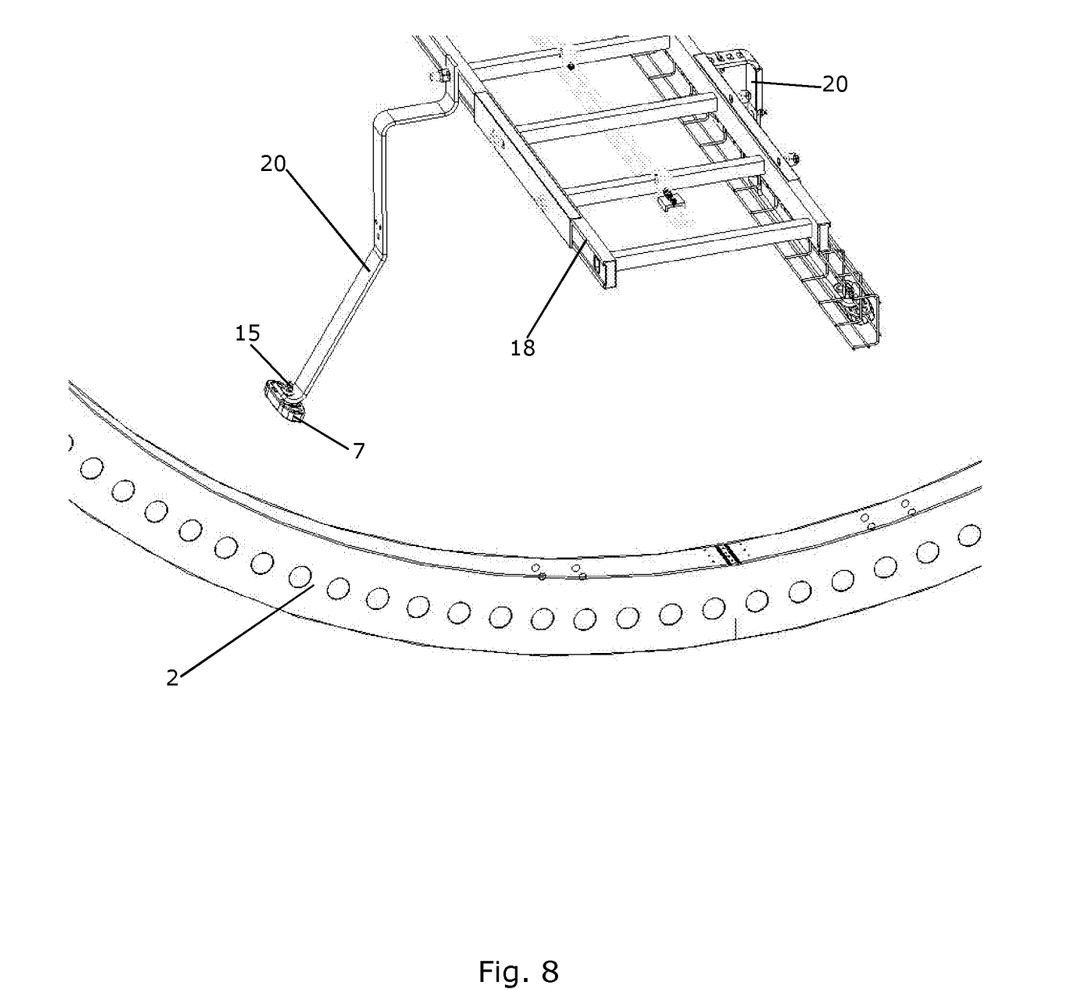

FIGS. 6-8 show a ladder 18 mounted on a wall of a wind turbine tower 2 by means of suspension arrangements 7 according to an embodiment of the invention. The suspension arrangements 7 could, e.g., be of the kind illustrated in FIGS. 2-5, and they may be attached to the wall of the wind turbine tower 2 in the manner described above.

The ladder 18 is mounted on the suspension arrangements 7 via mounting legs 20 which are in turn mounted on the suspension arrangements 7 via mounting interfaces 15. The suspension arrangements 7 are initially attached to the inner wall of the wind turbine tower 2, e.g. in the manner described above with reference to FIGS. 2-4. Next, the ladder 18 is mounted on the suspension arrangements 7 by attaching the mounting legs 20 to the mounting interfaces 15 of the suspension arrangements 7 by means of bolts screwed onto the mounting interfaces 15.

Moreover, the suspension arrangements 7 can be pre-mounted on the inner wall of the wind turbine tower 2 with the magnetic attachment means 8 in a position close to their end position. Then the ladder 18 can be arranged in position and attached to the suspension arrangements 7 that are still free to make adjustments. When the ladder 18 is in its final position the glue portions 11 are applied to the suspension arrangements 7 in order to finally attach them to the inner wall of the wind turbine 2.

It should be noted that, even though FIGS. 6-8 show a ladder 18 mounted on an inner wall of a wind turbine tower 2, the present invention also covers other kinds of components, such as platforms, cable holders, lamps, electrical equipment and cabinets, etc., mounted on walls of wind turbine towers or other kinds of supports, including steel foundations, nacelle walls, hub parts, etc.

Figure 9:
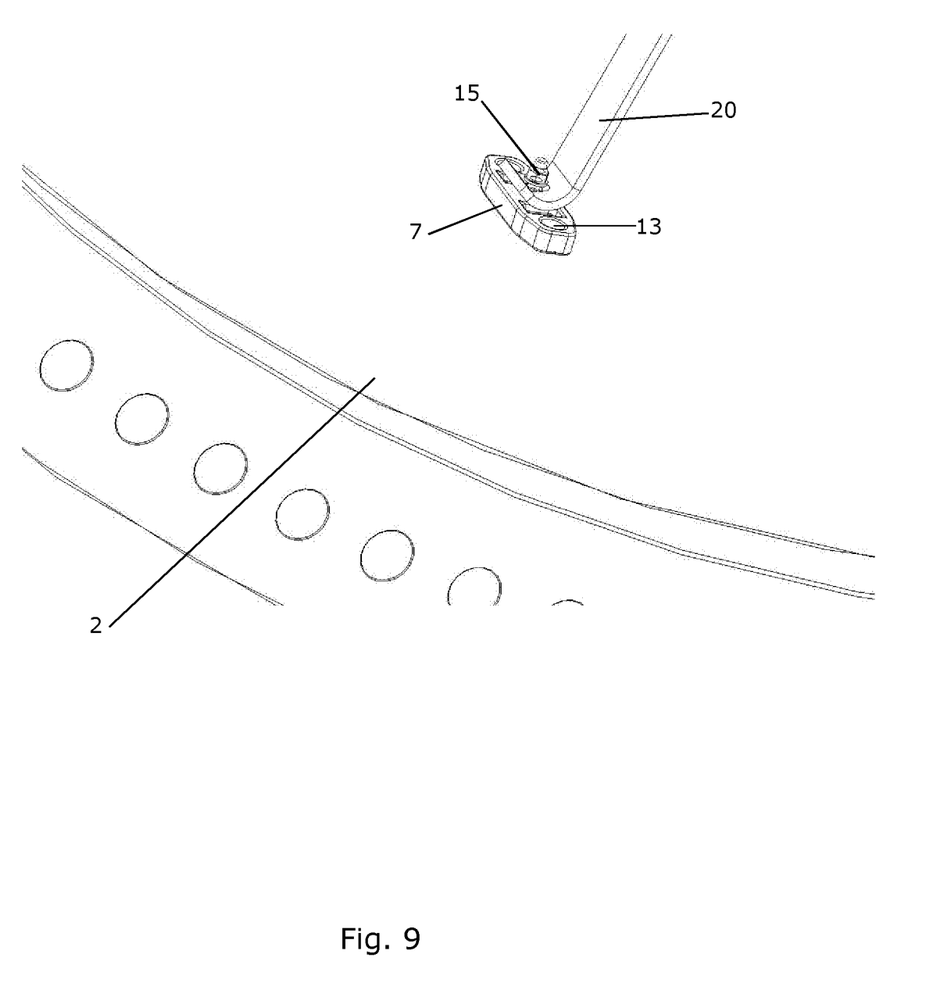
FIG. 9 is a detail of the ladder and suspension arrangement of FIGS. 6-8.

FIG. 9 is a detail of a suspension arrangement 7 and a mounting leg 20 of the kind illustrated in FIGS. 6-8. It can clearly be seen how the mounting leg 20 is attached to the mounting interface 15 of the suspension arrangement 7.

Figure 10:
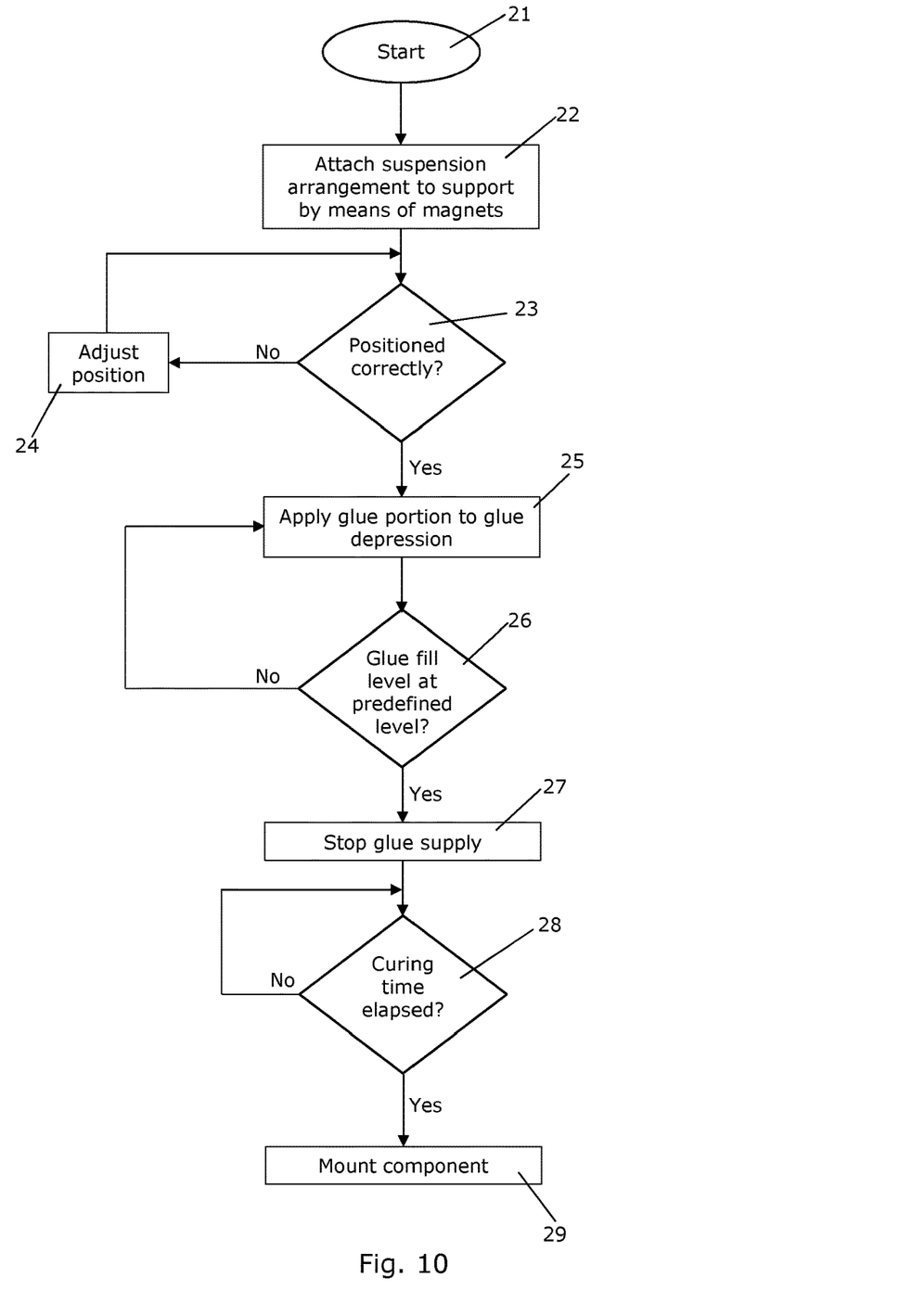
FIG. 10 is a flow chart illustrating a method according to a first embodiment of the invention.

FIG. 10 is a flow chart illustrating a method according to an embodiment of the invention. The process is started at step 21. At step 22, a suspension arrangement according to an embodiment of the invention is attached to a support being made from a magnetisable material, by means of magnetic attachment means of the suspension arrangement.

At step 23 it is investigated whether or not the suspension arrangement is positioned correctly with respect to the support, i.e. whether or not the suspension arrangement is in a correct or desired position. If this is not the case, the process is forwarded to step 24, where the position of the suspension arrangement with respect to the support is adjusted until the suspension arrangement is correctly positioned. This is possible because the magnetic forces acting between the magnetic attachment means of the suspension device and the magnetisable material of the support provide a releasable attachment.

When the suspension arrangement is positioned correctly with respect to the support, the process is forwarded to step 25, where a glue portion is supplied to glue depressions formed in a glue surface of the suspension arrangement. The suspension arrangement is arranged on the support in such manner that the glue surface, and thereby the glue depressions, are arranged against the support. Thereby the glue portion is applied to an interface between the suspension arrangement and the support.

At step 26 it is investigated whether or not a glue fill level in the glue depression has reached a predefined level. The predefined level could, e.g., be a level at which the glue depression is filled, ensuring that there are no voids between the glue and a surface of the support, thereby ensuring a desired holding capability of the glue portion towards the support. However, the glue depression should not be allowed to fill to a level where there is a risk that the glue portion pushes the suspension arrangement out of contact with the support. It may, e.g., be established whether or not the glue fill level in the glue depression has reached the predefined level by visually inspecting a glue fill check channel, through which glue spills when the predefined glue fill level has been reached.

In the case that step 26 reveals that the predefined glue fill level has not yet been reached, the process is returned to step 25 for continued supply of glue to the glue depression. In the case that step 26 reveals that the predefined glue fill level has been reached, the process is forwarded to step 27, and the glue supply to the glue depression is stopped.

The glue portion is now left to cure in order to provide a permanent attachment of the suspension arrangement to the support, by means of the glue portion. Accordingly, at step 28 it is investigated whether or not the required curing time has elapsed. When the required curing time has elapsed, the suspension arrangement is considered as being permanently attached to the support with a sufficient holding capability to withstand expected loads. The process is then forwarded to step 29, where a component is mounted on the suspension arrangement, via a mounting interface formed on the suspension arrangement. The component could be any suitable component which it is desired to mount on the support, e.g. a ladder, a platform, a lamp, a cable holder, etc.

Figure 11:
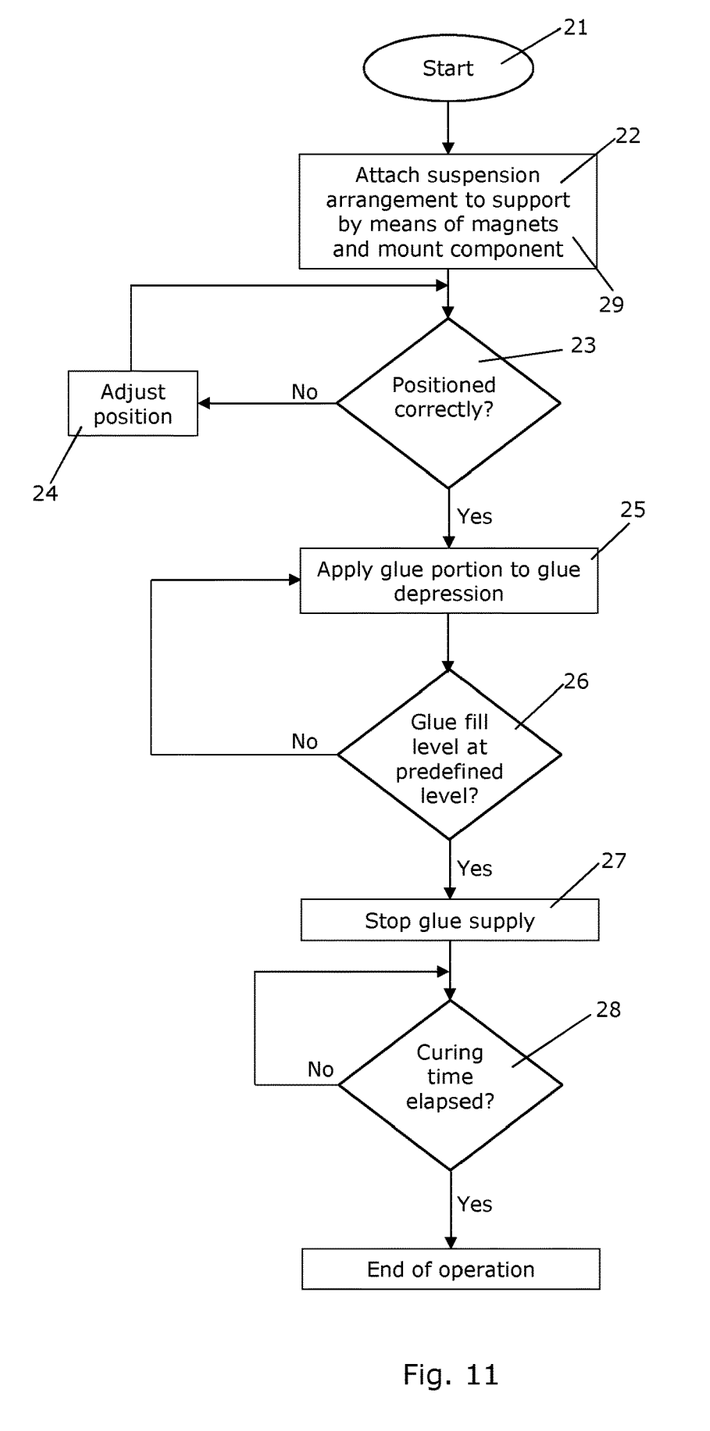
FIG. 11 is a flow chart illustrating a method according to a second embodiment of the invention.

FIG. 11 is a flow chart illustrating a method according to a second embodiment of the invention.

The method is similar to the method illustrated in FIG. 10, except that in this embodiment the suspension arrangements as well as the component are mounted prior to the application of the glue portion, see steps 22 and 29. In this way the component itself is used for positioning the suspension arrangements.

This embodiment can be varied in that the number of suspension arrangements can be selected such that the component, e.g. a ladder, can still be adjusted, i.e. for example four suspension arrangements can be attached to the component as a first step. Then the component with the four suspension arrangements is mounted to the support, e.g. in the form of an inner wall of a wind turbine tower. Then the suspension arrangements can be permanently attached by applying glue portions prior to mounting the remaining suspension arrangements. Alternatively the remaining suspension arrangements can be installed and then all suspension arrangements are permanently attached by applying glue portions in a single step.

The invention claimed is:

1. A suspension arrangement for attachment to a support being made from a magnetisable material, the suspension arrangement comprising:
   a magnetic attachment means comprising a magnetic material allowing the suspension arrangement to be releasably attached to the support, and
   a glue surface having a glue depression configured for receiving a glue portion in order to permanently attach the suspension arrangement to the support, the glue surface being arranged in contact with the support when the suspension arrangement is attached to the support.

2. The suspension arrangement according to claim 1, wherein a glue portion applied to the glue depression provides a holding capability against the support which is equal to or larger than a holding capability against the support provided by the magnetic attachment means.

3. The suspension arrangement according to claim 1, wherein the suspension arrangement is provided with at least one glue supply channel, wherein each glue supply channel is in communication with the glue depression, thereby allowing the glue depression to be filled with a glue portion when the glue surface is arranged against the support.

4. The suspension arrangement according to claim 3, wherein the at least one glue supply channel comprises an inlet opening formed in a surface of the suspension arrangement, said surface of the suspension arrangement being arranged free of the glue surface.

5. The suspension arrangement according to claim 3, further comprising at least one glue fill check channel in fluid contact with the glue depression and with a fill check outlet arranged in a surface of the suspension arrangement, said surface of the suspension arrangement being arranged free of the glue surface, the glue fill check channel being arranged such that glue exits through the fill check outlet when the glue depression is sufficiently filled to achieve its holding capability.

6. The suspension arrangement according to claim 1, wherein the suspension arrangement comprises a mounting interface configured for mounting a component on the suspension arrangement.

7. The suspension arrangement according to claim 1, wherein the glue portion comprises a two component adhesive.

8. The suspension arrangement according to claim 1, wherein the magnetic attachment means is or comprises a permanent magnet.

9. A wind turbine tower being made from a magnetisable material, wherein a support is assigned to a wall of the wind turbine tower, the wind turbine tower having at least one suspension arrangement according to claim 1 attached to the support with its glue surface in contact with the support.

10. The wind turbine tower according to claim 9, wherein a glue portion applied to the glue depression provides a holding capability against the support which is equal to or larger than a holding capability against the support provided by the magnetic attachment means.

11. A method for attaching a suspension arrangement to a support being made from a magnetisable material, the method comprising the steps of:

providing a suspension arrangement according claim 1,
positioning the suspension arrangement on the support by means of magnetic forces acting between the support and the magnetic attachment means of the suspension arrangement, the glue surface of the suspension arrangement being arranged against the support,
applying a glue portion to the glue depression of the suspension arrangement, thereby permanently attaching the suspension arrangement to the support.

12. The method according to claim 11, wherein the suspension arrangement further comprises a mounting interface, and wherein the method further comprises the step of mounting a component on the suspension arrangement via the mounting interface.

13. The method according to claim 11, further comprising the step of cleaning at least a portion of the support prior to positioning the suspension arrangement on the support.

14. The method according to claim 11, wherein the step of applying a glue portion to the glue depression comprises applying the glue portion via a glue supply channel formed in the suspension arrangement.

15. The method according to claim 11, further comprising the step of monitoring a glue filling level of glue applied to the glue depression, during the step of applying glue to the glue depression, and wherein the step of applying glue to the glue depression is stopped when the glue level reaches a predefined level.

16. The method according to claim 15, wherein the suspension arrangement further comprises at least one glue fill check channel in fluid contact with the glue depression and with a fill check outlet arranged in a surface of the suspension arrangement, said surface of the suspension arrangement being arranged free of the glue surface, and wherein the predefined level of glue is reached when glue exits said at least one glue fill check channel.

17. The method according to claim 11 wherein the method comprises the initial step of assigning the support to be part of a wall of a wind turbine tower.

18. The method according to claim 11, wherein the support comprises a wall of a wind turbine tower, the method further comprising:
attaching a wind turbine component to the suspension arrangement to support the wind turbine component from the wall of the wind turbine tower.

19. The suspension arrangement according to claim 1, wherein the magnetic attachment means and the glue surface are spaced away from each other so as to be separate structures.

* * * * *